US012456830B2

(12) United States Patent
Matsuo

(10) Patent No.: US 12,456,830 B2
(45) Date of Patent: Oct. 28, 2025

(54) CONNECTOR

(71) Applicant: Japan Aviation Electronics Industry, Limited, Tokyo (JP)

(72) Inventor: Seiya Matsuo, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 305 days.

(21) Appl. No.: 18/347,966

(22) Filed: Jul. 6, 2023

(65) Prior Publication Data

US 2024/0106145 A1 Mar. 28, 2024

(30) Foreign Application Priority Data

Sep. 28, 2022 (JP) ................................ 2022-154602

(51) Int. Cl.
*H01R 12/77* (2011.01)
*H01R 13/639* (2006.01)
*H01R 13/514* (2006.01)

(52) U.S. Cl.
CPC ......... *H01R 12/777* (2013.01); *H01R 12/774* (2013.01); *H01R 13/639* (2013.01); *H01R 13/514* (2013.01)

(58) Field of Classification Search
CPC ... H01R 12/777; H01R 12/744; H01R 13/639
See application file for complete search history.

(56) References Cited

U.S. PATENT DOCUMENTS

| | | | | |
|---|---|---|---|---|
| 10,199,770 | B2 * | 2/2019 | Komoto | H01R 12/69 |
| 10,617,155 | B2 * | 4/2020 | Komoto | H01R 13/62 |
| 10,868,380 | B1 * | 12/2020 | Komoto | H01R 12/771 |
| 10,886,650 | B1 * | 1/2021 | Komoto | H01R 12/592 |
| 11,024,993 | B2 * | 6/2021 | Nakamura | H01R 12/616 |
| 11,121,479 | B2 * | 9/2021 | Komoto | H01R 24/20 |
| 11,258,189 | B2 * | 2/2022 | Hashiguchi | H01R 13/502 |
| 2009/0208168 | A1 * | 8/2009 | Ishikawa | H01R 12/79<br>439/620.22 |
| 2018/0233854 | A1 | 8/2018 | Komoto et al. | |
| 2018/0269606 | A1 * | 9/2018 | Nakamura | H01R 12/68 |
| 2021/0057838 | A1 * | 2/2021 | Komoto | H01R 13/10 |

(Continued)

FOREIGN PATENT DOCUMENTS

JP 2018129244 A 8/2018

*Primary Examiner* — Neil Abrams

(74) *Attorney, Agent, or Firm* — MUNCY, GEISSLER, OLDS & LOWE, P.C.

(57) ABSTRACT

The connector includes a conductive plug contact, a bottom insulator, and a conductive inner contact, the inner contact including a retaining portion retained in a recessed portion of the plug contact, an elastically deformable flat plate portion facing a bottom surface of a flange of the plug contact, a plurality of top surface-side projections projecting toward the bottom surface of the flange from a top surface of the flat plate portion, and a plurality of bottom surface-side projections projecting toward a support surface of the bottom insulator from a bottom surface of the flat plate portion separately at positions different from positions of the top surface-side projections, part of a sheet type connection object having a conductor exposed on at least one surface thereof being sandwiched between the bottom surface of the flange of the plug contact and the top surface-side projections of the inner contact.

8 Claims, 11 Drawing Sheets

(56) References Cited

U.S. PATENT DOCUMENTS

| | | | | |
|---|---|---|---|---|
| 2021/0075146 | A1* | 3/2021 | Matsuo | H01R 13/5025 |
| 2023/0420902 | A1* | 12/2023 | Kimura | H01R 12/777 |
| 2024/0106145 | A1* | 3/2024 | Matsuo | H01R 12/7011 |
| 2024/0388027 | A1* | 11/2024 | Ashibu | H05K 1/0283 |

* cited by examiner

CONNECTOR

BACKGROUND OF THE INVENTION

The present invention relates to a connector, particularly to a connector connected to a sheet type connection object having a conductor exposed on at least one surface of the connection object.

In recent years, attention has been drawn to so-called smart clothes that can obtain user's biological data such as the heart rate and the body temperature only by being worn by the user. Such smart cloth has an electrode disposed at a measurement site, and when a wearable device serving as a measurement device is electrically connected to the electrode, biological data can be transmitted to the wearable device.

The electrode and the wearable device can be interconnected by, for instance, use of a connector connected to a conductor drawn from the electrode.

As a connector of this type, for example, JP 2018-129244 A discloses a connector as illustrated in FIG. 21. The connector includes a housing 2 and a base member 3 that are disposed on the opposite sides of a flexible substrate 1 to sandwich the flexible substrate 1 therebetween. Tubular portions 4A of contacts 4 are passed through contact through-holes 2A of the housing 2, and flanges 4B of the contacts 4 are sandwiched between the housing 2 and conductors 1A exposed on a top surface of the flexible substrate 1.

In this state, when the base member 3 is pressed against the housing 2, as shown in FIG. 22, a projection 3A of the base member 3 is inserted into a projection accommodating portion 4C of the contact 4 with the flexible substrate 1 being sandwiched therebetween, and the inner surface of the projection accommodating portion 4C makes contact with the conductor 1A with a predetermined contact force, whereby the contact 4 is electrically connected to the conductor 1A.

Further, housing fixing posts 3B formed to project from the base member 3 are press-fitted into post accommodating portions 2B of the housing 2 as shown in FIG. 21, so that the housing 2 and the base member 3 are fixed to each other.

When fitted to the connector disclosed in JP 2018-129244 A, a wearable device can be connected to electrodes constituted of the conductors.

However, when the conductors 1A are exposed on the bottom surface of the flexible substrate 1, the connector of JP 2018-129244 A would be useless in electrically connecting the conductors 1A to the contacts 4.

SUMMARY OF THE INVENTION

The present invention has been made to solve the foregoing problem and aims at providing a connector that enables to make an electrical connection of a contact to a conductor of a connection object regardless of whether the conductor is exposed on the top surface or the bottom surface of the connection object.

The connector according to the invention comprises:

a plug contact having conductivity and including a tubular portion and a flange, the tubular portion extending along a fitting axis and having a recessed portion formed therein, and the flange extending from an end portion of the tubular portion in a direction perpendicular to the fitting axis;

a bottom insulator including a support surface that extends in the direction perpendicular to the fitting axis; and an inner contact having conductivity and disposed on the support surface, part of the inner contact being inserted in the recessed portion, wherein the inner contact includes: a retaining portion retained in the recessed portion and making contact with an inner surface of the recessed portion to be electrically connected to the plug contact; a flat plate portion being elastically deformable, joined to the retaining portion, extending in the direction perpendicular to the fitting axis, and facing a bottom surface of the flange; a plurality of top surface-side projections projecting toward the bottom surface of the flange from a top surface of the flat plate portion; and a plurality of bottom surface-side projections projecting toward the support surface from a bottom surface of the flat plate portion separately at positions different from positions of the top surface-side projections, and part of a connection object of sheet type having a conductor exposed on at least one surface of the connection object is sandwiched in a direction along the fitting axis between the bottom surface of the flange of the plug contact and the top surface-side projections of the inner contact, the bottom surface of the flange makes contact with a top surface of the connection object, and the top surface-side projections make contact with a bottom surface of the connection object, whereby the plug contact is electrically connected to the conductor directly when the conductor is exposed on the top surface of the connection object, and the plug contact is electrically connected to the conductor via the inner contact when the conductor is exposed on the bottom surface of the connection object.

DETAILED DESCRIPTION OF THE INVENTION

An embodiment of the present invention is described below with reference to the accompanying drawings.

Figure 1:
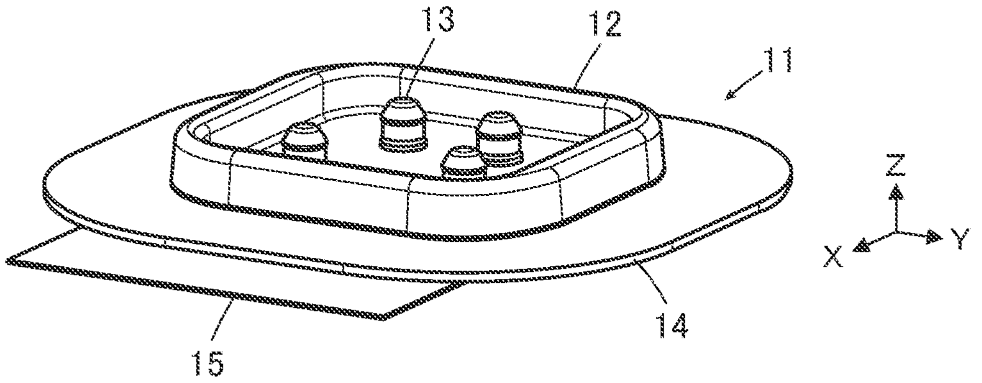
FIG. 1 is a perspective view showing a connector according to an embodiment when viewed from an obliquely upper position.

FIG. 1 shows a connector 11 according to the embodiment. The connector 11 is, for instance, used as a garment-side connector for fitting a wearable device and has a housing 12 made of an insulating material. Four plug contacts 13 are retained in the housing 12, and a reinforcement sheet 14 and a sheet type conductive member 15 being superposed on each other are retained by the housing 12. The sheet type conductive member 15 constitutes a connection object to which the connector 11 is connected.

The four plug contacts 13 are arranged in two rows parallel to each other and disposed to project perpendicularly to the sheet type conductive member 15.

For convenience, the reinforcement sheet 14 and the sheet type conductive member 15 are defined as extending in an XY plane, the arrangement direction of the four plug contacts 13 is referred to as "Y direction," and the direction in which the four plug contacts 13 project is referred to as "+Z direction." The Z direction is a fitting direction in which the connector 11 is fitted to a counter connector.

Figure 2:
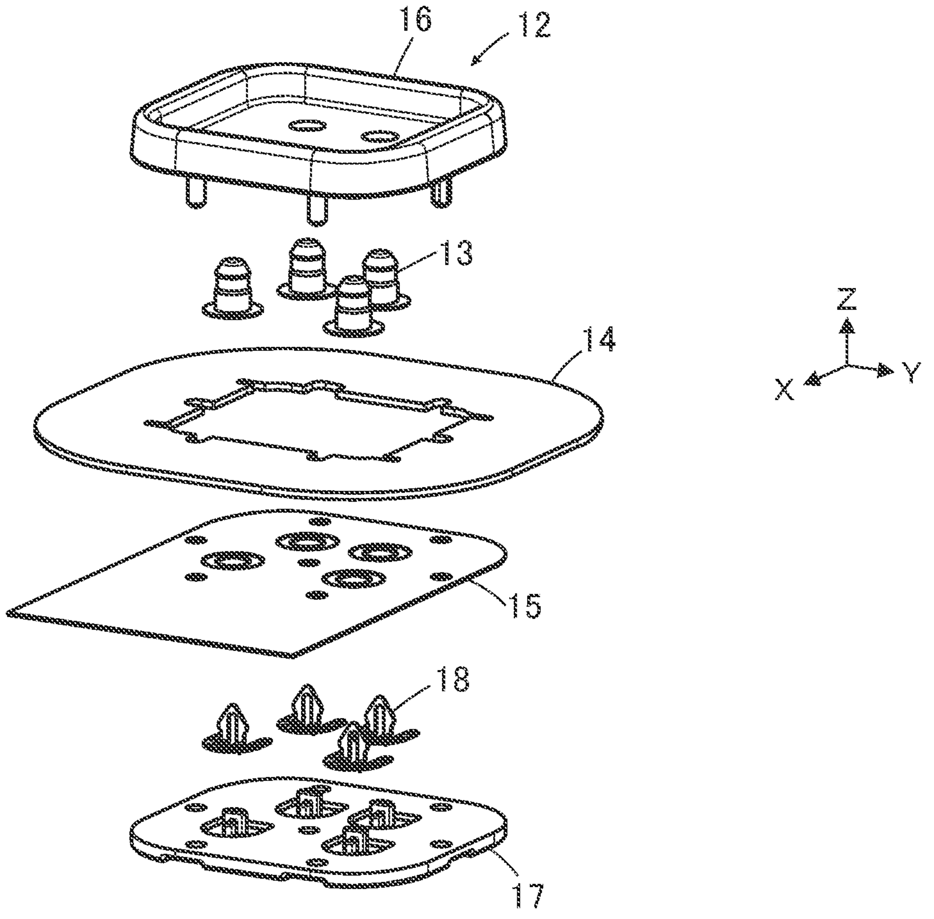
FIG. 2 is an exploded perspective view of the connector according to the embodiment.

FIG. 2 shows an exploded perspective view of the connector 11. The connector 11 includes a top insulator 16 and a bottom insulator 17, and these top and bottom insulators 16 and 17 constitute the housing 12.

The four plug contacts 13 are retained in the top insulator 16. The reinforcement sheet 14 is disposed on the bottom surface, on the −Z direction side, of the top insulator 16, and the sheet type conductive member 15 is disposed on the −Z direction side of the reinforcement sheet 14. Further, four inner contacts 18 are disposed on the −Z direction side of the sheet type conductive member 15, and the bottom insulator 17 is disposed on the −Z direction side of the inner contacts 18. The four inner contacts 18 separately correspond to the four plug contacts 13.

Figure 3:
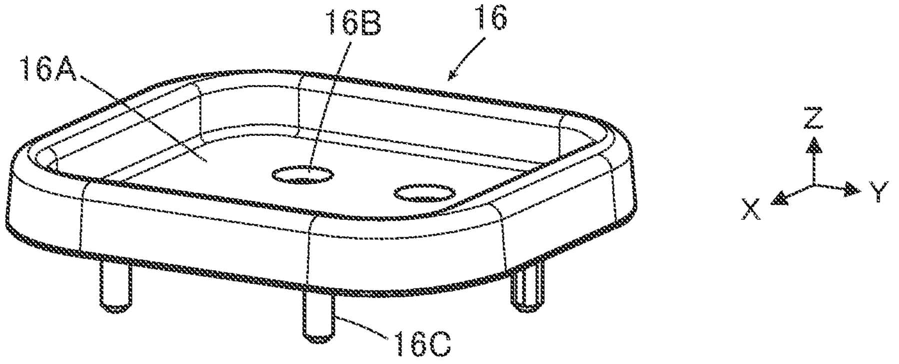
FIG. 3 is a perspective view showing a top insulator used in the connector of the embodiment.

As shown in FIG. 3, the top insulator 16 includes a recessed portion 16A opening in the +Z direction and four contact through-holes 16B formed within the recessed portion 16A. The recessed portion 16A constitutes a counter connector accommodating portion in which part of a counter connector (not shown) is to be accommodated, and the four contact through-holes 16B correspond to the four plug contacts 13. On a surface of the top insulator 16 facing in the −Z direction, a plurality of bosses 16C are formed to project in the −Z direction.

The four plug contacts 13 are made of a conductive material such as metal, and are to be connected to corresponding contacts of a counter connector (not shown) when part of the counter connector is accommodated in the recessed portion 16A of the top insulator 16.

Figure 4:
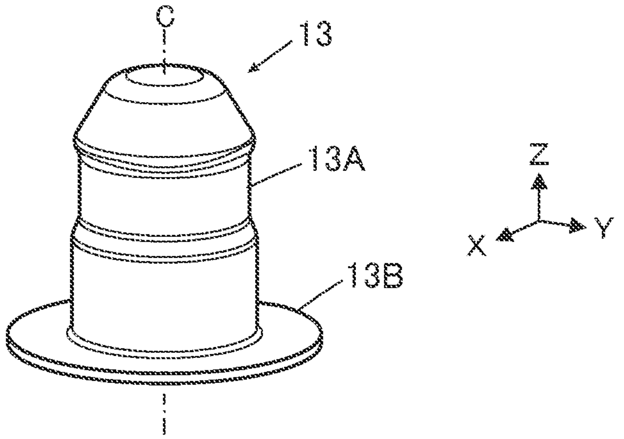
FIG. 4 is a perspective view showing a plug contact used in the connector of the embodiment.

As shown in FIG. 4, the plug contact 13 has a tubular portion 13A in the shape of a cylindrical tube extending in the Z direction along the fitting axis C and a flange 13B extending along an XY plane from the −Z directional end of the tubular portion 13A.

Figure 5:
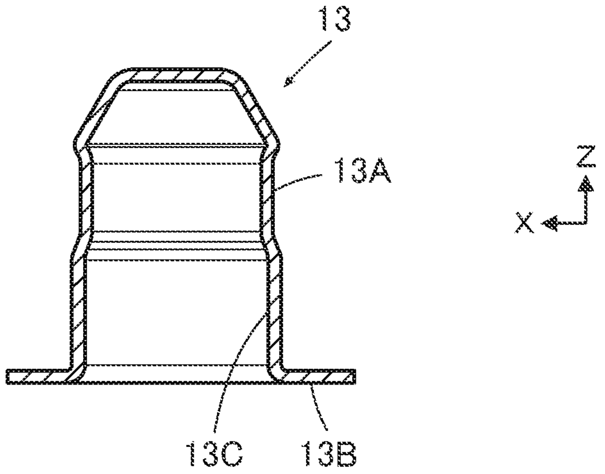
FIG. 5 is a cross-sectional view showing the plug contact used in the connector of the embodiment.

As shown in FIG. 5, the tubular portion 13A is provided in its interior with a recessed portion 13C opening toward the −Z direction.

The fitting axis C is an axis passing through the center of the tubular portion 13A and extending in the direction in which the connector 11 and the counter connector are fitted to each other.

While the tubular portion 13A has the shape of a cylindrical tube, the cross section thereof is not limited to a circle and may be any of various shapes such as an ellipse and a polygon as long as the tubular portion 13A has the recessed portion 13C in its interior.

The four plug contacts 13 can be each used as a terminal for transmitting electric signals.

Figure 6:
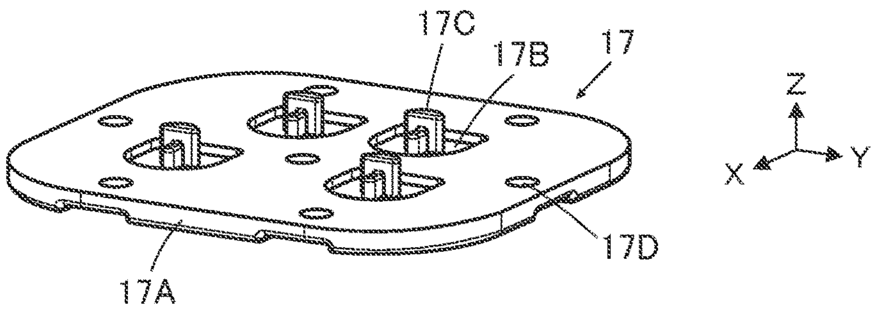
FIG. 6 is a perspective view showing a bottom insulator used in the connector of the embodiment.

As shown in FIG. 6, the bottom insulator 17 includes a flat plate portion 17A, and the flat plate portion 17A is provided with four recessed portions 17B opening in the +Z direction. The four recessed portions 17B correspond to the four plug contacts 13. The recessed portions 17B are separately provided with four projections 17C each projecting in the +Z direction from a center portion of the recessed portion 17B.

Further, the flat plate portion 17A is provided with a plurality of through-holes 17D corresponding to the bosses 16C of the top insulator 16.

Figure 7:
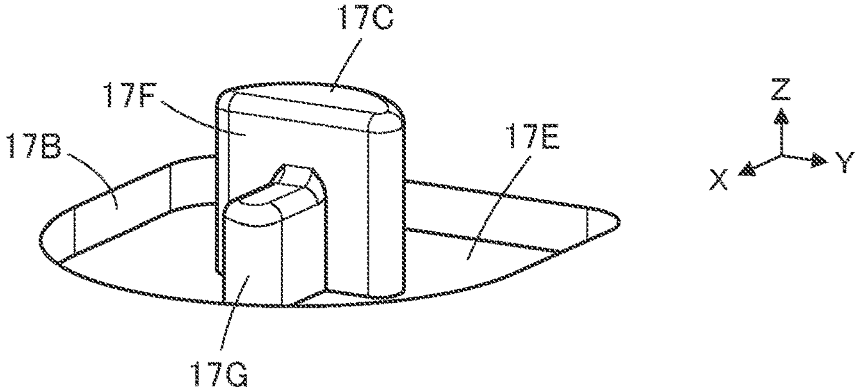
FIG. 7 is a perspective view showing a projection of the bottom insulator used in the connector of the embodiment.
Figure 8:
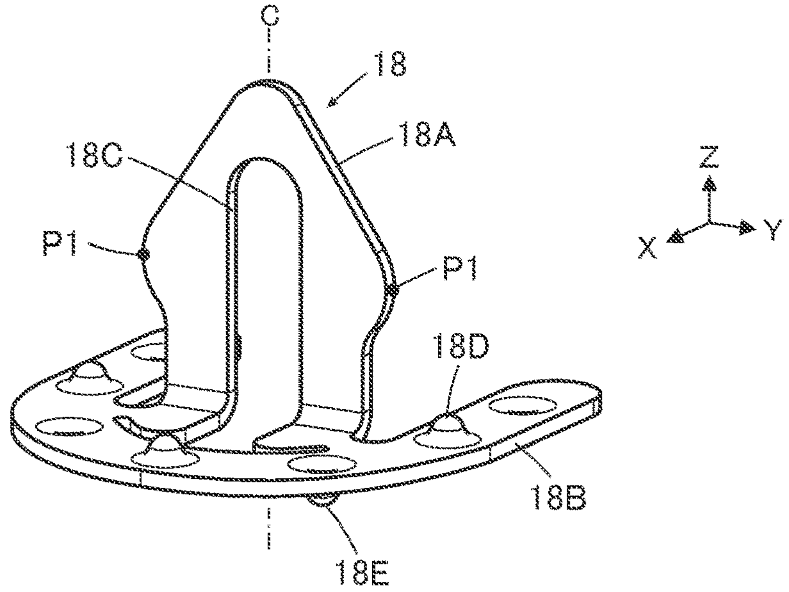
FIG. 8 is a perspective view showing an inner contact used in the connector of the embodiment.

As shown in FIG. 7, a bottom surface of the recessed portion 17B of the bottom insulator 17 constitutes a support surface 17E extending along an XY plane and facing in the +Z direction.

The projection 17C is used to temporarily retain the inner contact 18 and includes a backrest surface 17F extending along a YZ plane and facing in the +X direction and a protrusion portion 17G projecting in the +X direction from a portion, situated at the center in the Y direction and on the −Z direction side, of the backrest surface 17F.

As shown in FIGS. 8 to 11, the inner contact 18 is formed of a conductive metal plate being bent and includes a retaining portion 18A and a flat plate portion 18B connected to the −Z directional end of the retaining portion 18A. When the connector 11 is assembled, the retaining portion 18A is inserted into the recessed portion 13C of the corresponding plug contact 13, and the flat plate portion 18B is disposed on the support surface 17E of the corresponding recessed portion 17B of the bottom insulator 17.

The retaining portion 18A has a flat plate shape extending along a YZ plane including the fitting axis C and is provided with a pair of contact point portions P1 separately at the +Y directional end and the −Y directional end of the retaining portion 18A, the contact point portions P1 being separated from each other in the Y direction.

In addition, the retaining portion 18A is provided with a notch 18C extending in the −Z direction from a vicinity of the +Z directional end of the retaining portion 18A and opening toward the −Z direction. When the connector 11 is assembled, the protrusion portion 17G of the projection 17C of the bottom insulator 17 is fitted in the notch 18C of the retaining portion 18A.

A distance in the Y direction between the pair of contact point portions P1 is designed to be slightly larger than an inner diameter of a part of the recessed portion 13C of the plug contact 13, with which part the contact point portions P1 make contact when the retaining portion 18A is inserted in the recessed portion 13C.

With this constitution, by inserting the retaining portion 18A of the inner contact 18 into the recessed portion 13C of the plug contact 13, the pair of contact point portions P1 make contact with an inner surface of the recessed portion 13C with a predetermined contact pressure while elastically displacing in a direction toward the fitting axis C.

The flat plate portion 18B is a band plate-shaped member curving around the fixing axis C and extending along an XY plane. On a top surface of the flat plate portion 18B facing in the +Z direction, a plurality of top surface-side projections 18D are formed to project in the +Z direction, and on a bottom surface of the flat plate portion 18B facing in the −Z direction, on the other hand, a plurality of bottom surface-side projections 18E are formed to project in the −Z direction.

Figure 9:
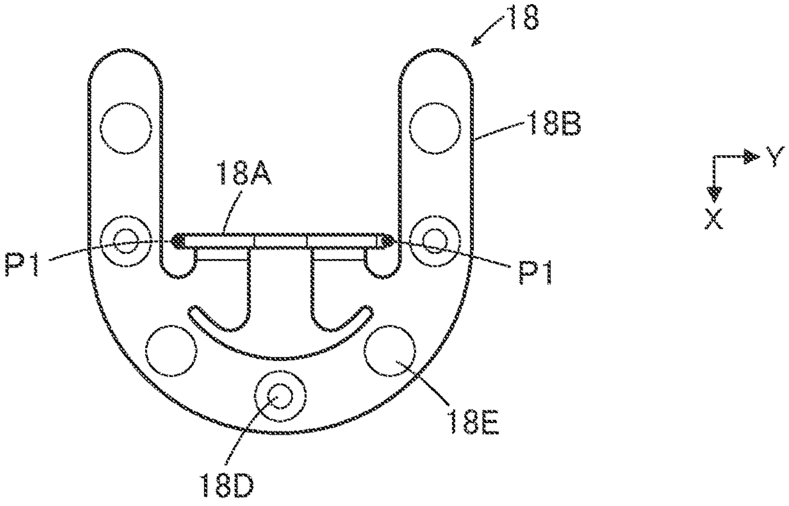
FIG. 9 is a plan view showing the inner contact used in the connector of the embodiment.

As shown in FIG. 9, the flat plate portion 18B has a U shape or a horseshoe shape extending as curving so as to encircle the retaining portion 18A, and the top surface side-projections 18D and the bottom surface-side projections 18E are alternately disposed in the direction in which the flat plate portion 18B extends.

Figure 10:
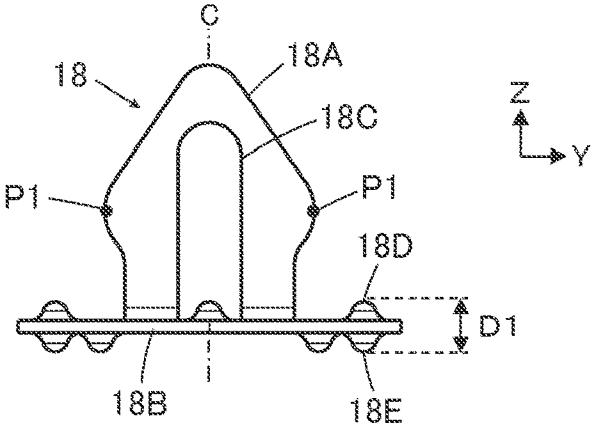
FIG. 10 is a front view showing the inner contact used in the connector of the embodiment.
Figure 11:
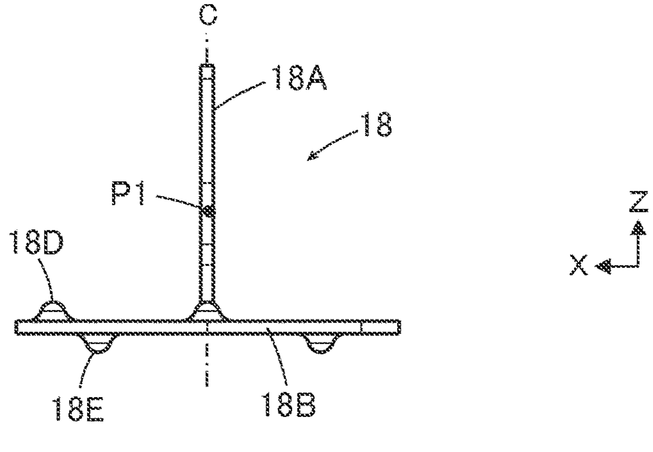
FIG. 11 is a side view showing the inner contact used in the connector of the embodiment.

With no external force being applied to the inner contact 18, the +Z directional end of the top surface-side projection 18D is assumed to be separated from the −Z directional end of the bottom surface-side projection 18E by a distance D1 in the Z direction as shown in FIG. 10.

The sheet type conductive member 15 has a multilayer structure in which a plurality of wiring layers each formed of a conductor and a plurality of insulating layers are laminated.

Figure 12:
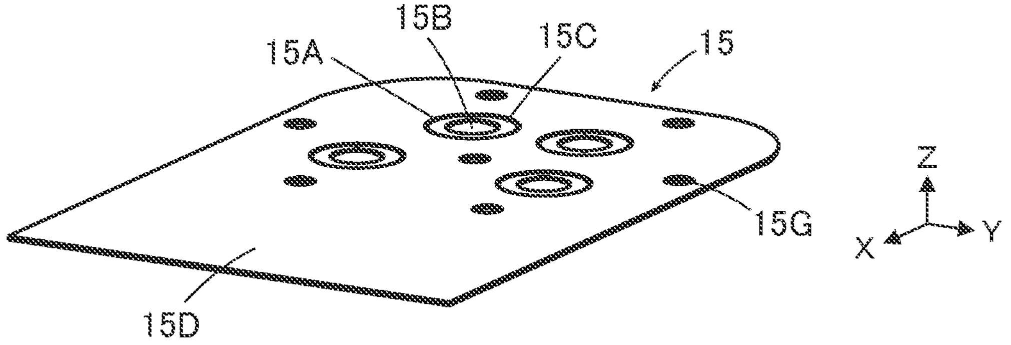
FIG. 12 is a perspective view of a connection object to be connected to the connector of the embodiment when viewed from an obliquely upper position.

As shown in FIG. 12, four contact arrangement regions 15A used to arrange the four plug contacts 13 are defined on the top surface, facing the +Z direction, of the sheet type conductive member 15. At a center portion of each contact arrangement region 15A, a circular opening portion 15B through which the sheet type conductive member 15 is passed in the Z direction is formed, and around the opening portion 15B, a wiring layer 15C is exposed toward the +Z direction so as to surround the opening portion 15B. An insulating layer 15D is exposed in a region excluding the four contact arrangement regions 15A.

Figure 13:
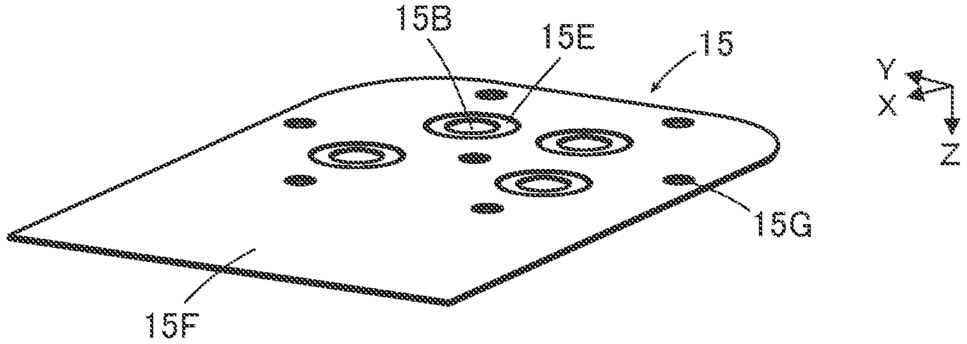
FIG. 13 is a perspective view of the connection object to be connected to the connector of the embodiment when viewed from an obliquely lower position.

Since the opening portion 15B penetrates the sheet type conductive member 15 in the Z direction, as shown in FIG. 13, the opening portions 15B are also seen on the bottom surface of the sheet type conductive member 15 facing in the −Z direction at positions separately corresponding to the four contact arrangement regions 15A.

On the bottom surface of the sheet type conductive member 15 facing in the −Z direction, a wiring layer 15E is exposed toward the −Z direction so as to surround the opening portions 15B separately formed at the positions corresponding to the four contact arrangement regions 15A, and an insulating layer 15F is exposed in the remaining region.

Further, the sheet type conductive member 15 is provided at its peripheral portion with a plurality of through-holes 15G corresponding to the bosses 16C of the top insulator 16, as shown in FIGS. 12 and 13.

Figure 14:
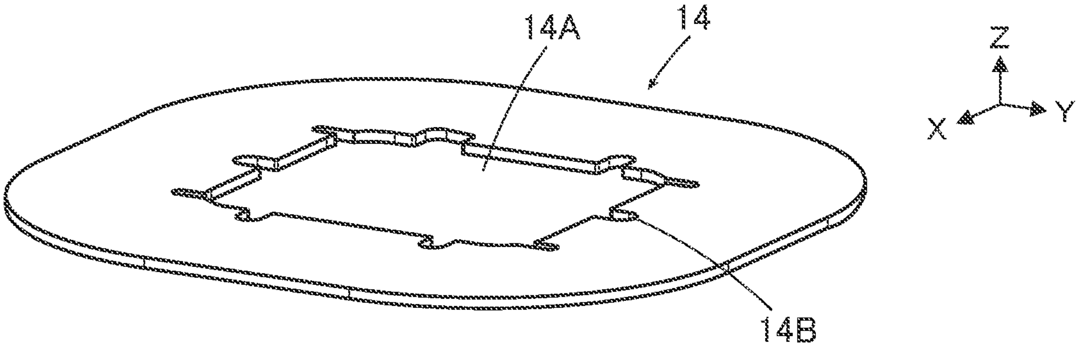
FIG. 14 is a perspective view showing a reinforcement sheet used in the connector of the embodiment.

As shown in FIG. 14, the reinforcement sheet 14 is provided to reinforce a mounting object (not shown), such as a garment, on which the connector 11 is to be mounted. The reinforcement sheet 14 is made of an insulating material and provided at its center with an opening 14A. Further, a plurality of notches 14B corresponding to the bosses 16C of the top insulator 16 are formed along the periphery of the opening 14A of the reinforcement sheet 14.

The four contact through-holes 16B of the top insulator 16, the four plug contacts 13, the four contact arrangement regions 15A of the sheet type conductive member 15, the four inner contacts 18, and the four recessed portions 17B of the bottom insulator 17 are arranged so as to align with one another in the Z direction.

The bosses 16C of the top insulator 16, the notches 14B of the reinforcement sheet 14, the through-holes 15G of the sheet type conductive member 15, and the through-holes 17D of the bottom insulator 17 are arranged so as to align with one another in the Z direction.

Figure 15:
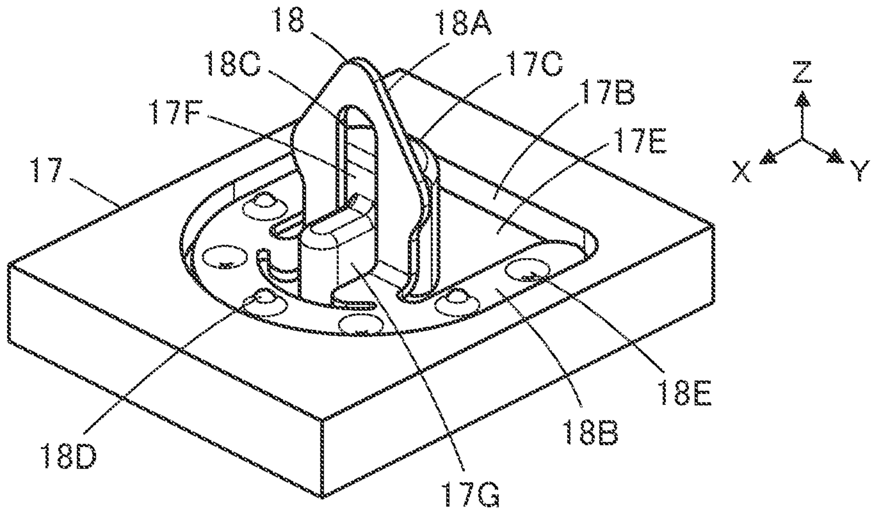
FIG. 15 is a perspective view showing the inner contact temporarily retained by the projection of the bottom insulator.

When the connector 11 is assembled, first, as shown in FIG. 15, the inner contact 18 is temporarily retained by the projection 17C of the corresponding recessed portion 17B of the bottom insulator 17. In this process, the flat plate portion 18B of the inner contact 18 is inserted in the recessed portion 17B of the bottom insulator 17, and the protrusion portion 17G of the projection 17C of the bottom insulator 17 is fitted in the notch 18C of the retaining portion 18A, whereby the −X directional surface of the retaining portion 18A is brought into contact with the backrest surface 17F of the projection 17C.

The bottom surface-side projections 18E formed on the bottom surface, facing in the −Z direction, of the flat plate portion 18B of the inner contact 18 are disposed on the support surface 17E of the recessed portion 17B of the bottom insulator 17.

Next, the bosses 16C of the top insulator 16 are separately inserted into the notches 14B of the reinforcement sheet 14. At this time, the four contact through-holes 16B of the top insulator 16 are situated inside the opening 14A of the reinforcement sheet 14.

Further, the tubular portions 13A of the plug contacts 13 are inserted correspondingly into the four contact through-holes 16B of the top insulator 16 from the −Z direction, and the bottom insulator 17 is pressed against the top insulator 16 in the +Z direction with the sheet type conductive member 15 being sandwiched therebetween.

In this process, the retaining portion 18A of the inner contact 18 temporarily retained by the projection 17C of the bottom insulator 17 is inserted into the recessed portion 13C of the corresponding plug contact 13 via the opening portion 15B of the sheet type conductive member 15, the flange 13B of the plug contact 13 is positioned on the corresponding contact arrangement region 15A of the sheet type conductive member 15, and the sheet type conductive member 15 is sandwiched between the top surface-side projections 18D formed on the top surface, facing in the +Z direction, of the flat plate portion 18B of the inner contact 18 and the bottom surface on the −Z direction side of the flange 13B of the plug contact 13.

Figure 16:
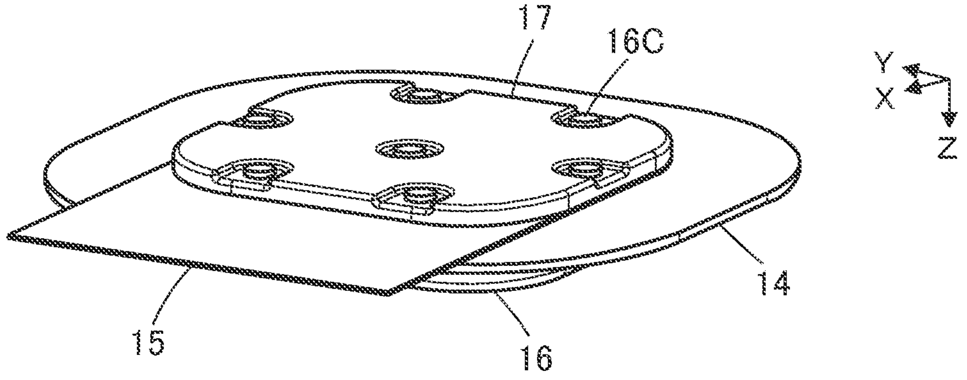
FIG. 16 is a perspective view of the connector of the embodiment when viewed from an obliquely lower position.

When the bottom insulator 17 is pressed against the top insulator 16, the bosses 16C of the top insulator 16 sequentially pass through the notches 14B of the reinforcement sheet 14, the through-holes 15G of the sheet type conductive member 15, and the through-holes 17D of the bottom insulator 17. Then, the ends of the bosses 16C projecting on the −Z directional side of the bottom insulator 17 are heated and deformed, whereby the top insulator 16 and the bottom insulator 17 are fixed to each other as shown in FIG. 16. Thus, the assembling operation of the connector 11 is completed.

Figure 17:
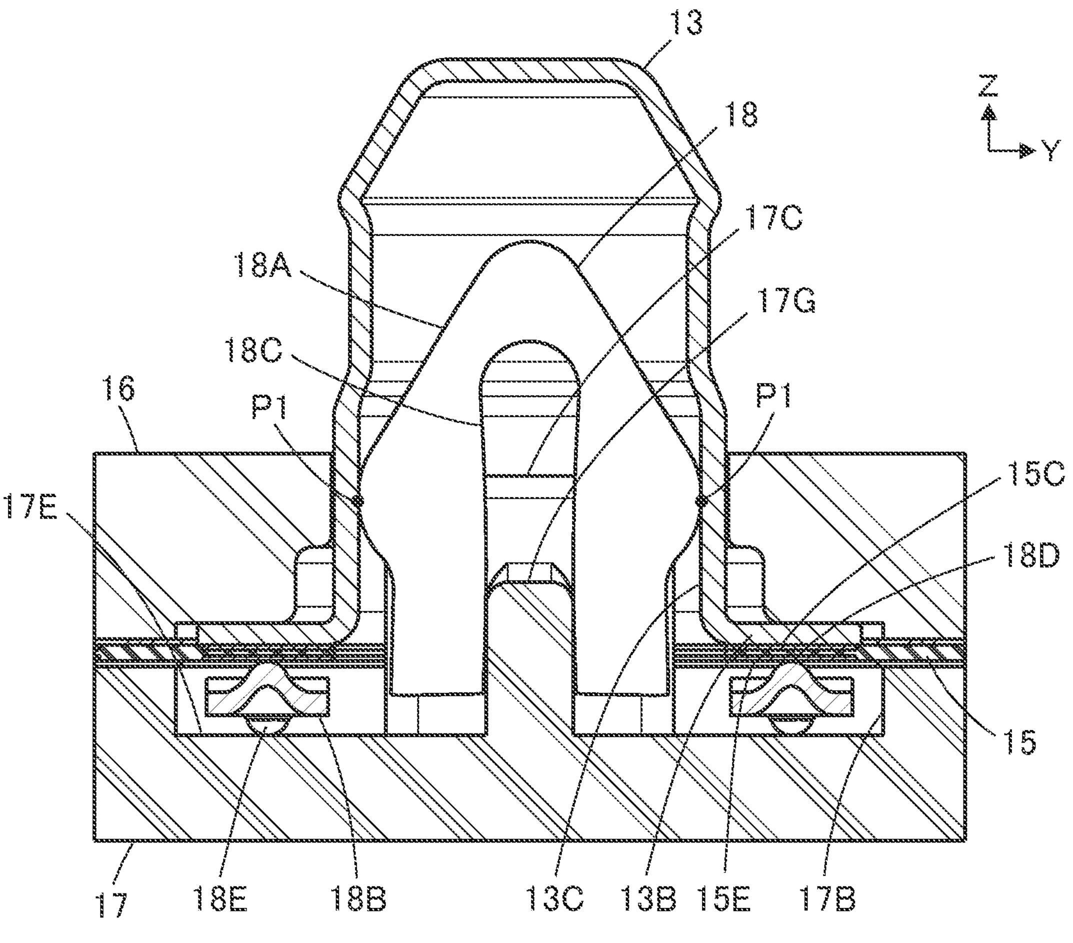
FIG. 17 is a partial cross-sectional front view showing an interior of the plug contact with the inner contact being inserted therein, in the connector of the embodiment connected to the connection object.
Figure 18:
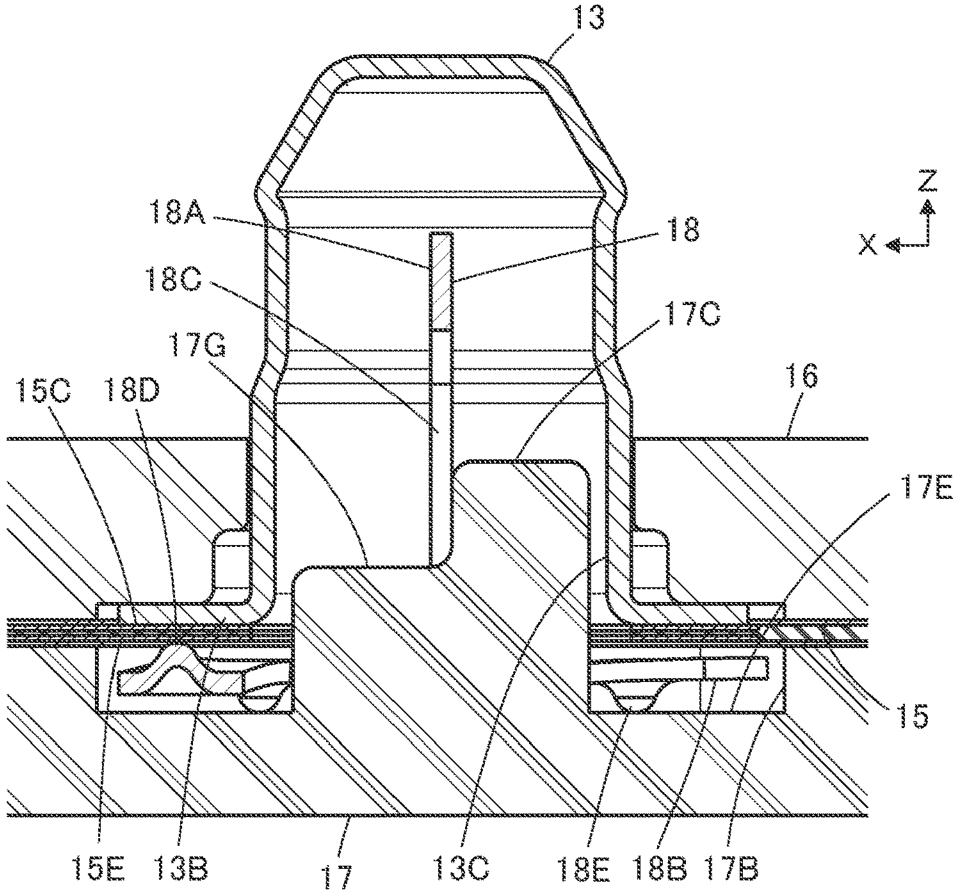
FIG. 18 is a partial cross-sectional side view showing the interior of the plug contact with the inner contact being inserted therein, in the connector of the embodiment connected to the connection object.

As shown in FIGS. 17 and 18, when the retaining portion 18A of the inner contact 18 is inserted in the recessed portion 13C of the plug contact 13, the pair of contact point portions P1 separately formed at the +Y directional end and the −Y directional end of the retaining portion 18A are pressed against the inner surface of the recessed portion 13C of the plug contact 13, whereby the inner contact 18 is electrically connected to the plug contact 13.

In addition, when the bottom insulator 17 is pressed against the top insulator 16, the top surface-side projections 18D formed on the top surface, facing in the +Z direction, of the flat plate portion 18B of the inner contact 18 receive pressing force acting in the −Z direction from the top insulator 16 via the flange 13B of the plug contact 13 and the sheet type conductive member 15. At this time, the bottom surface-side projections 18E formed on the bottom surface, facing in the −Z direction, of the flat plate portion 18B of the inner contact 18 are disposed on the support surface 17E of the recessed portion 17B of the bottom insulator 17, and hence due to the pressing force acting in the −Z direction on the top surface-side projections 18D, the flat plate portion 18B of the inner contact 18 elastically deforms such that the distance along the Z direction between the +Z directional end of the top surface-side projection 18D and the −Z directional end of the bottom surface-side projection 18E is narrowed.

Figure 19:
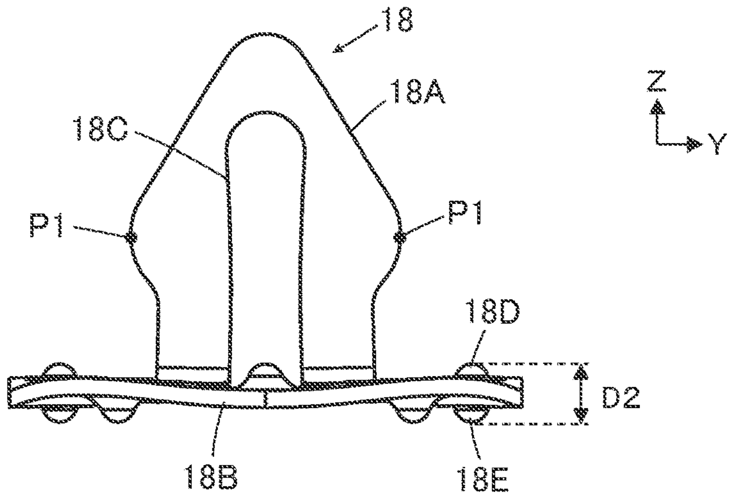
FIG. 19 is a front view showing the inner contact with its flat plate portion being elastically deformed.
Figure 20:
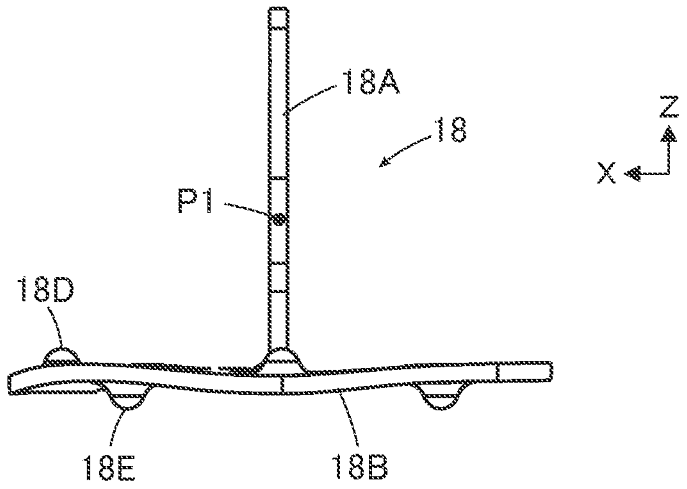
FIG. 20 is a side view showing the inner contact with its flat plate portion being elastically deformed.
Figure 21:
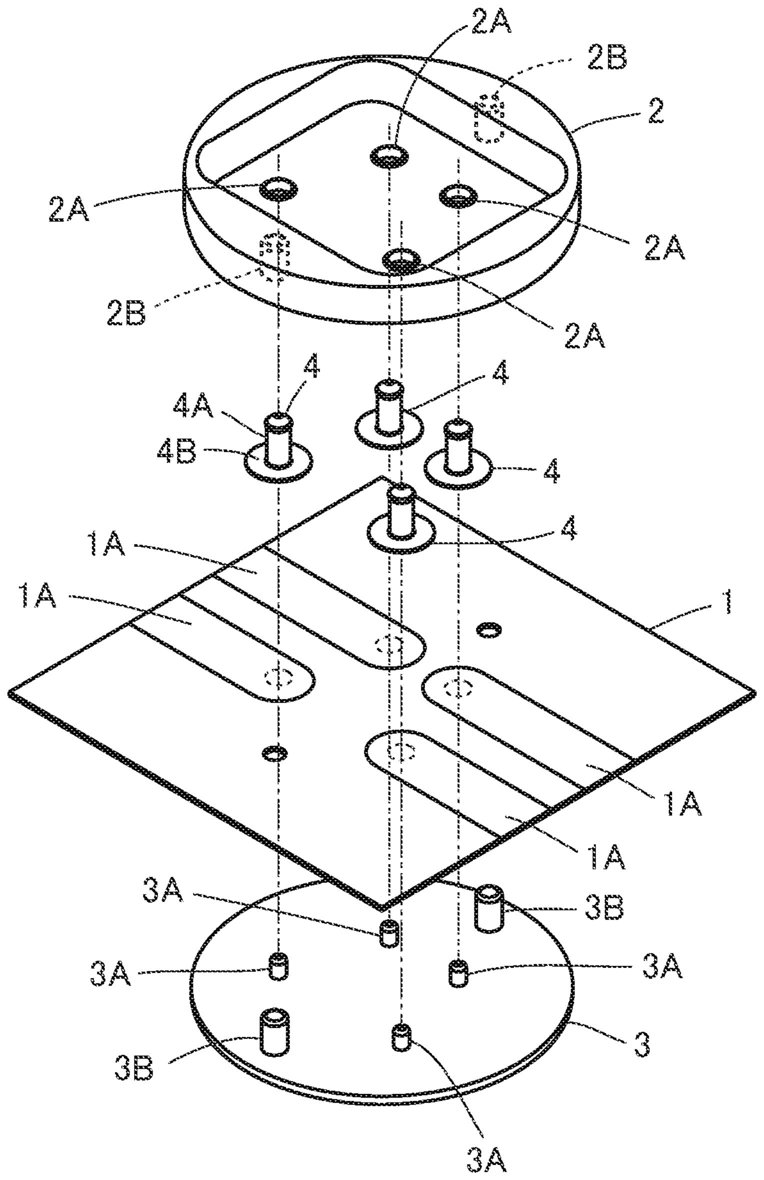
FIG. 21 PRIOR ART
FIG. 21 is an exploded perspective view of a conventional connector.
Figure 22:
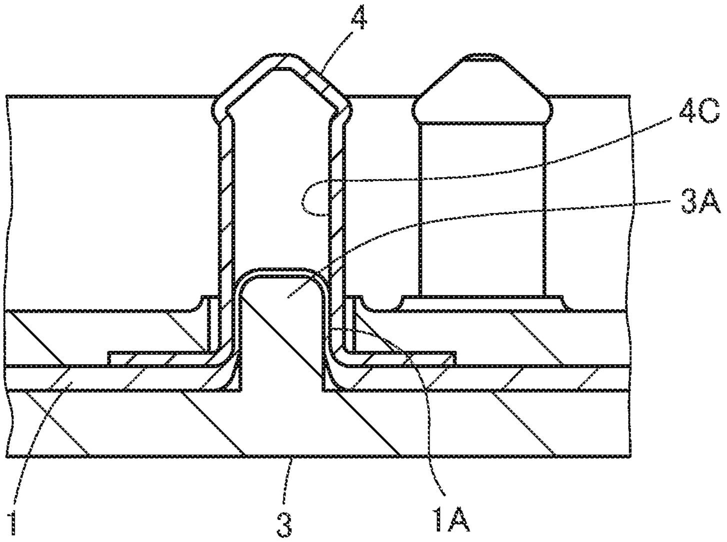
FIG. 22 PRIOR ART
FIG. 22 is a partial cross-sectional view showing the conventional connector.

Since in the flat plate portion 18B of the inner contact 18, the top surface-side projections 18D and the bottom surface-side projections 18E are alternately disposed along the direction in which the flat plate portion 18B extends, as shown in FIGS. 19 and 20, the flat plate portion 18B elastically deforms wavily with respect to an XY plane, so that a distance D2 along the Z direction between the +Z directional end of the top surface-side projection 18D and the −Z directional end of the bottom surface-side projection 18E becomes narrower than the distance D1 shown in FIG. 10.

As a result, the top surface-side projections 18D are pressed against the bottom surface of the sheet type conductive member 15 in the +Z direction, and in addition, the top surface of the sheet type conductive member 15 is pressed against the bottom surface of the flange 13B of the plug contact 13 in the +Z direction.

In the meantime, as shown in FIGS. 12 and 13, the wiring layer 15C is exposed around the opening portions 15B in the contact arrangement regions 15A on the top surface of the sheet type conductive member 15, and the wiring layer 15E is exposed around the opening portions 15B at the positions corresponding to the contact arrangement regions 15A on the bottom surface of the sheet type conductive member 15.

Accordingly, the wiring layer 15C on the top surface of the sheet type conductive member 15 makes contact with the bottom surface of the flange 13B of the plug contact 13 with a predetermined contact pressure, and the wiring layer 15E on the bottom surface of the sheet type conductive member 15 makes contact with the top surface-side projections 18D of the inner contact 18 with a predetermined contact pressure.

Accordingly, the wiring layer 15C exposed on the top surface of the sheet type conductive member 15 is electrically connected to the plug contact 13 directly, and the wiring layer 15E exposed on the bottom surface of the sheet type conductive member 15 is electrically connected to the plug contact 13 via the inner contact 18. In other words, both the wiring layers 15C and 15E are connected to the plug contact 13.

Thus, with the connector 11, both the wiring layer 15C formed of a conductor and disposed on the top surface side of the sheet type conductive member 15 and the wiring layer 15E formed of a conductor and disposed on the bottom surface side of the same can be electrically connected to one plug contact 13 by use of the inner contact 18.

Therefore, when the connector 11 is connected to a sheet type conductive member having a conductor exposed only on the top surface side, the plug contact 13 can be electrically connected to the conductor on the top surface side of the sheet type conductive member, and when the connector 11 is connected to a sheet type conductive member having a conductor exposed only on the bottom surface side, the plug contact 13 can be electrically connected to the conductor on the bottom surface side of the sheet type conductive member.

Further, when the connector 11 is connected to a sheet type conductive member having conductors exposed on both of the top and bottom surfaces like the sheet type conductive member 15 in the embodiment, the plug contact 13 can be electrically connected to both the conductor on the top surface side and the conductor on the bottom surface side of the sheet type conductive member. For instance, in the case of using, as the connection object, a sheet type conductive member having a multilayer structure in which conductors each constituting a shielding layer are exposed on both of the top and bottom surface sides separately and another conductor constituting a signal wiring layer is disposed between those shielding layers while being insulated from both of the shielding layers, when the plug contact 13 connected to the shielding layers on the top and bottom surface sides is connected to a ground potential, a shielding effect with respect to the signal wiring layer is demonstrated, and highly accurate signal transmission can be carried out with the influence of disturbance caused by electromagnetic waves being minimized.

The flat plate portion 18B of the inner contact 18 has a U shape or a horseshoe shape as shown in FIG. 9, but the invention is not limited thereto, and the flat plate portion 18B may have a circular disc shape extending along an XY plane as with the flange 13B of the plug contact 13.

In the embodiment described above, the plug contact 13 disposed in the contact arrangement region 15A of the sheet type conductive member 15 is connected to both of the wiring layer 15C exposed on the top surface side of the sheet type conductive member 15 and the wiring layer 15E exposed on the bottom surface side of the sheet type conductive member 15, but the plug contact 13 disposed in the contact arrangement region 15A may be connected only to the wiring layer 15E exposed on the bottom surface side of the sheet type conductive member 15, for example.

The sheet type conductive member 15 used in the embodiment described above has a multilayer structure, but the invention is not limited thereto, and it suffices if the sheet type conductive member 15 has a conductor exposed on at least one surface thereof.

In addition, a double-layered conductor comprising the wiring layer 15C and the wiring layer 15E of the sheet type conductive member 15 is connected to one plug contact 13 in the embodiment described above, but the invention is not limited thereto, and a triple- or more-layered conductor may be connected to one plug contact 13.

In addition, while the connector 11 according to the embodiment described above includes four plug contacts 13, the number of the plug contacts 13 is not limited thereto, and it suffices if at least the connector 11 includes one plug contact 13 to be electrically connected to a conductor exposed on at least one surface of the sheet type conductive member 15.

While the reinforcement sheet 14 is disposed between the bottom insulator 17 and the top insulator 16 in the embodiment described above, the reinforcement sheet 14 may be omitted when it is not necessary to reinforce a mounting object, such as a garment, on which the connector 11 is to be mounted.

What is claimed is:

1. A connector comprising:

a plug contact having conductivity and including a tubular portion and a flange, the tubular portion extending along a fitting axis and having a recessed portion formed therein, and the flange extending from an end portion of the tubular portion in a direction perpendicular to the fitting axis;

a bottom insulator including a support surface that extends in the direction perpendicular to the fitting axis; and an inner contact having conductivity and disposed on the support surface, part of the inner contact being inserted in the recessed portion, wherein the inner contact includes: a retaining portion retained in the recessed portion and making contact with an inner surface of the recessed portion to be electrically connected to the plug contact; a flat plate portion being elastically deformable, joined to the retaining portion, extending in the direction perpendicular to the fitting axis, and facing a bottom surface of the flange; a plurality of top surface-side projections projecting toward the bottom surface of the flange from a top surface of the flat plate portion; and a plurality of bottom surface-side projections projecting toward the support surface from a bottom surface of the flat plate portion separately at positions different from positions of the top surface-side projections, and part of a connection object of sheet type having a conductor exposed on at least one surface of the connection object is sandwiched in a direction along the fitting axis between the bottom surface of the flange of the plug contact and the top surface-side projections of the inner contact, the bottom surface of the flange makes contact with a top surface of the connection object, and the top surface-side projections make contact with a bottom surface of the connection object, whereby the plug contact is electrically connected to the conductor directly when the conductor is exposed on the top surface of the connection object, and the plug contact is electrically connected to the conductor via the inner contact when the conductor is exposed on the bottom surface of the connection object.

2. The connector according to claim 1, wherein the top surface-side projections make contact with the bottom surface of the connection object, and the bottom surface-side projections make contact with the support surface, whereby the flat plate portion elastically deforms such that a distance along the fitting axis between tip ends of the top surface-side projections and tip ends of the bottom surface-side projections is narrowed, and the top surface-side projections elastically contact the bottom surface of the connection object.

3. The connector according to claim 1, wherein the flat plate portion extends as curving around the fitting axis, and the top surface-side projections and the bottom surface-side projections are alternately disposed along a direction in which the flat plate portion extends.

4. The connector according to claim 1, wherein the retaining portion includes a pair of contact point portions that are separated from each other in the direction perpendicular to the fitting axis and make contact with the inner surface of the recessed portion.

5. The connector according to claim 4, wherein the retaining portion has a flat plate shape extending along a plane including the fitting axis.

6. The connector according to claim 5, wherein the bottom insulator includes a projection for temporarily retaining the inner contact.

7. The connector according to claim 6, wherein the retaining portion includes a notch extending toward the support surface, and the projection includes a backrest surface extending along the retaining portion, and a protrusion portion projecting from the backrest surface and being fitted in the notch.

8. The connector according to claim 1, comprising a top insulator provided with a contact through-hole through which the tubular portion of the plug contact is passed and which is smaller than the flange, wherein the top insulator is fixed to the bottom insulator such that the tubular portion of the plug contact is passed through the contact through-hole and that the flange of the plug contact, the connection object, and the flat plate portion of the inner contact are sandwiched between the top insulator and the bottom insulator.

* * * * *